United States Patent
Kano et al.

(10) Patent No.: US 10,224,775 B2
(45) Date of Patent: Mar. 5, 2019

(54) LINEAR MOTOR HAVING COILS THROUGH WHICH A THREE-PHASE ALTERNATING CURRENT PASSES

(71) Applicants: NATIONAL INSTITUTE OF TECHNOLOGY, Tokyo (JP); KYB Corporation, Tokyo (JP)

(72) Inventors: Yoshiaki Kano, Aichi (JP); Kousuke Sato, Kanagawa (JP); Noriyuki Takahashi, Kanagawa (JP)

(73) Assignees: NATIONAL INSTITUTE OF TECHNOLOGY, Tokyo (JP); KYB Corporation, Tokyo (JP)

( * ) Notice: Subject to any disclaimer, the term of this patent is extended or adjusted under 35 U.S.C. 154(b) by 207 days.

(21) Appl. No.: 15/110,973

(22) PCT Filed: Oct. 23, 2014

(86) PCT No.: PCT/JP2014/078266
§ 371 (c)(1),
(2) Date: Jul. 12, 2016

(87) PCT Pub. No.: WO2015/136761
PCT Pub. Date: Sep. 17, 2015

(65) Prior Publication Data
US 2016/0329768 A1  Nov. 10, 2016

(30) Foreign Application Priority Data

Mar. 12, 2014 (JP) ................................. 2014-049302

(51) Int. Cl.
*H02K 3/28* (2006.01)
*H02K 41/03* (2006.01)

(52) U.S. Cl.
CPC ............. *H02K 3/28* (2013.01); *H02K 41/031* (2013.01)

(58) Field of Classification Search
CPC ............ H02K 1/165; H02K 1/34; H02K 3/28; H02K 29/03; H02K 41/03; H02K 41/031; H02K 2213/03
(Continued)

(56) References Cited

U.S. PATENT DOCUMENTS

2008/0001483 A1  1/2008 Kitamura et al.
2012/0025634 A1* 2/2012 Dajaku .................... H02K 3/20
                                                  310/12.21

FOREIGN PATENT DOCUMENTS

JP  2008-005665 A  1/2008
JP  2009-291069 A  12/2009
(Continued)

*Primary Examiner* — Quyen P Leung
*Assistant Examiner* — Minki Chang
(74) *Attorney, Agent, or Firm* — Rabin & Berdo, P.C.

(57) ABSTRACT

A linear motor that displaces a tubular body and a rod relative to each other in an axial direction includes teeth arranged in the axial direction so as to project from an inner peripheral surface of the tubular body, slots formed between adjacent teeth, coils disposed in the slots, and permanent magnets provided in the rod and arranged in the axial direction. The coils are constituted by one or more first phase coils, one or more second phase coils, and one or more third phase coils. The first, second, and third phase coils are provided in the axial direction such that the first phase coil and the second phase coil are disposed at respective ends the tubular body. A total number of coil windings of the third phase coils is set to be smaller than a total number of coil windings of the first phase coils and a total number of coil windings of the second phase coils.

2 Claims, 3 Drawing Sheets

(58) Field of Classification Search
USPC ............... 310/12.01, 12.24, 12.25, 12.26, 14
See application file for complete search history.

(56) References Cited

FOREIGN PATENT DOCUMENTS

| | | |
|---|---|---|
| JP | 2013-219882 A | 10/2013 |
| WO | WO 2006-117335 A1 | 11/2006 |

* cited by examiner

LINEAR MOTOR HAVING COILS THROUGH WHICH A THREE-PHASE ALTERNATING CURRENT PASSES

TECHNICAL FIELD

This invention relates to a linear motor.

BACKGROUND ART

JP2009-291069A discloses a linear motor that displaces a tubular yoke and a rod relative to each other in an axial direction by attracting a permanent magnet disposed on an outer peripheral surface of the rod using a moving magnetic field generated around a coil disposed on an inner peripheral surface of the yoke. In this linear motor, force attracting the permanent magnet functions as thrust for displacing the tubular yoke and the rod relative to each other in the axial direction.

SUMMARY OF INVENTION

Referring to FIG. 1 of JP2009-291069A, the linear motor includes two each of a U phase coil, a V phase coil, and a W phase coil, through which a three-phase alternating current is passed. The coils of the respective phases are arranged in sequence in a yoke axis direction such that a W phase coil and a U phase coil are disposed in respective end positions of the yoke. The U phase coils, the V phase coils, and the W phase coils are set to have identical numbers of coil windings.

The inventors of this invention, having analyzed a magnetic field generated in the coils by passing a current through the coils in a simulation, found that magnetic flux linkage in the coils disposed in the respective end positions of the yoke decreases relative to magnetic flux linkage in the other coils disposed in a central position and so on of the yoke.

In other words, in the linear motor shown in FIG. 1 of JP2009-291069A, magnetic flux linkage decreases in the W phase coil and the U phase coil disposed in the respective end positions of the yoke. When magnetic flux linkage decreases in this manner, thrust (W phase component thrust) generated on the basis of the moving magnetic field of the two W phase coils and thrust (U phase component thrust) generated on the basis of the moving magnetic field of the two U phase coils become smaller than thrust (V phase component thrust) generated on the basis of the moving magnetic field of the two V phase coils. Accordingly, a thrust ripple is generated due to the variation in the thrust of the respective phase components, and as a result, a controllability of the linear motor deteriorates.

An object of this invention is to provide a linear motor with which generation of a thrust ripple can be suppressed.

A linear motor according to an aspect of this invention has a tubular body and a rod that penetrates the tubular body in an axial direction, and is configured to displace the tubular body and the rod relative to each other in the axial direction. The linear motor includes a plurality of teeth arranged in the axial direction so as to project from an inner peripheral surface of the tubular body, slots formed between adjacent teeth of the plurality of teeth, a plurality of coils disposed in the slots, and permanent magnets provided in the rod and arranged in the axial direction so as to oppose the coils. The plurality of coils are constituted by one or more first phase coils, one or more second phase coils, and one or more third phase coils, a three-phase alternating current being passed through the first, second, and third phase coils. The first, second, and third phase coils are provided in the axial direction such that the first phase coil and the second phase coil are disposed respectively in the two slots positioned at respective ends the tubular body. A total number of coil windings of the third phase coils is set to be smaller than a total number of coil windings of the first phase coils and a total number of coil windings of the second phase coils.

DESCRIPTION OF EMBODIMENTS

An embodiment of this invention will be described below with reference to the attached figures.

Figure 1:
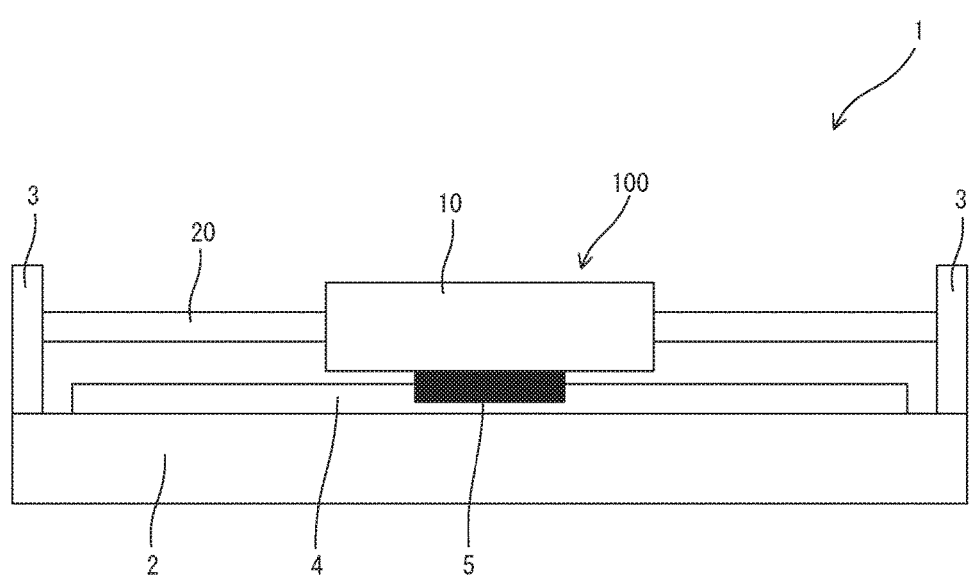
FIG. 1 is a schematic view showing a configuration of an actuation system including a linear motor according to an embodiment of this invention.

Referring to FIG. 1, an actuation system 1 including a linear motor 100 according to this embodiment will be described.

The actuation system 1 includes the linear motor 100 which includes a tubular yoke 10 and a rod 20, a carrying portion 2 on which the linear motor 100 is carried, a support portion 3 erected on the carrying portion 2 to support respective ends of the rod 20, a rail 4 disposed on the carrying portion 2, and a carrier 5 that moves along the rail 4 while the yoke 10 is fixed thereto. When the linear motor 100 is driven, the yoke 10 moves along the rail 4 together with the carrier 5. In the actuation system 1, a driving subject such as a component is mounted on the yoke 10 so that the driving subject can be moved in a straight line.

It should be noted that although the actuation system 1 is configured as a driving actuation system for driving a driving subject, the actuation system 1 is not limited to this configuration. By attaching the yoke 10 of the linear motor 100 to one of two members that are displaced relative to each other and attaching the rod 20 of the linear motor 100 to the other member, the actuation system 1 may be configured as a damping actuation system that suppresses the relative displacement between the two members.

Next, referring to FIG. 2, a configuration of the linear motor 100 that serves as a drive source of the actuation system 1 will be described.

The linear motor 100 includes the yoke 10 that is formed as a tubular body, the rod 20 that penetrates the interior of the yoke 10 in a yoke axis direction, a plurality of coils 30 provided in the yoke 10, and a plurality of permanent magnets 21 held in the rod 20. In the linear motor 100, thrust for displacing the yoke 10 and the rod 20 relative to each other in an axial direction is generated by attracting the permanent magnets 21 held in the rod 20 using a moving magnetic field that is generated around the coils 30 when an alternating current is passed through the coils 30.

The yoke 10 is a cylindrical member formed from a magnetic material (soft iron, for example). Teeth 12 are formed in the yoke 10 so as to project toward a yoke center from an inner peripheral surface 11.

Each tooth 12 includes an upright portion 12A that stands upright from the inner peripheral surface 11 and extends in an inner peripheral direction of the yoke 10, and a tip end portion 12B provided on a tip end of the upright portion 12A. An end surface of the tip end portion 12B of the tooth 12 is configured to oppose an outer peripheral surface of the rod 20. A width (a thickness in the yoke axis direction) of the tip end portion 12B is set to be larger than a width (a thickness in the yoke axis direction) of the upright portion 12A. Further, the width of the tip end portion 12B is formed to increase gradually toward the yoke center.

Nineteen teeth 12 configured as described above are arranged in the axial direction of the yoke 10. The teeth 12 are disposed at equal intervals between respective ends of the yoke 10. The widths of the upright portions 12A and tip end portions 12B of the teeth 12 positioned at the respective ends of the yoke 10 are set at half the widths of the upright portions 12A and tip end portions 12B of the other teeth 12.

Slots 13 are formed between adjacent teeth 12, 12 in the axial direction. The slots 13 are annular grooves in which the coils 30 are disposed. In the linear motor 100, nineteen teeth 12 are provided, and therefore the number of slots 13 is eighteen. One coil 30 is disposed in the interior of each slot 13.

The number of coils 30 corresponds to the number of slots, i.e. eighteen. The eighteen coils 30 are constituted by six U phase coils U1 to U6, six V phase coils V1 to V6, and six W phase coils W1 to W6. A U phase current of the three-phase alternating current is passed through the U phase coils U1 to U6. Further, a V phase current of the three-phase alternating current is passed through the V phase coils V1 to V6, and a W phase current of the three-phase alternating current is passed through the W phase coils W1 to W6.

The U phase coils U1 to U6, V phase coils V1 to V6, and W phase coils W1 to W6 are formed in a ring shape by winding an insulation-coated metal wire 30A around the rod 20. It should be noted that, in FIG. 2, only a part of the metal wire 30A of the V phase coil V1 is shown and all other parts are omitted.

Further, the U phase coils U1 to U6, V phase coils V1 to V6, and W phase coils W1 to W6 are disposed alternately, one phase at a time, in order of the V phase, the U phase, and the W phase from the left end side slot 13 toward the right end side slot 13. In the linear motor 100, the V phase coil V1 is disposed in the slot 13 positioned at a left end of the yoke 10, and the W phase coil W6 is disposed in the slot 13 positioned at a right end of the yoke.

The rod 20 is a cylindrical member disposed coaxially with the yoke 10 and formed from a non-magnetic material (stainless steel, for example). The rod 20 includes a through hole 20A that penetrates the rod 20 in the axial direction. Respective ends of the rod 20 are fixed to the support portion 3 (see FIG. 1) provided on the carrying portion 2 (see FIG. 1).

The plurality of permanent magnets 21 are held in the through hole 20A in the rod 20 and arranged in the axial direction so as to oppose the tip end portions 12B of the teeth 12. The permanent magnets 21 are formed in a columnar shape and polarized so that an N pole and an S pole occur in the axial direction. The permanent magnets 21 are provided at equal intervals, and adjacent permanent magnets 21 are disposed so that identical poles face each other. Further, columnar yokes 22 formed from a magnetic material are provided between adjacent permanent magnets 21.

In the linear motor 100, respective numbers of the permanent magnets 21 and the columnar yokes 22 positioned in the yoke 10 in a condition where the rod 20 is inserted into the yoke 10 are set at six. In other words, a sum of an axial direction length of the six permanent magnets 21 and six columnar yokes 22 arranged in the rod 20 is set to be equal to an axial direction length of the yoke 10, or in other words a distance between outside ends of the teeth 12 positioned at the respective ends of the yoke 10. Hence, the linear motor 100 is configured as a six-pole, eighteen-slot linear motor in which the number of permanent magnets positioned in the yoke 10 is six and the number of slots 13 formed in the yoke 10 is eighteen.

It should be noted that in the linear motor 100, the columnar yokes 22 do not necessarily have to be provided, and instead the permanent magnets 21 may be provided directly adjacent to each other. In this case, the axial direction length of the six permanent magnets positioned in the yoke 10 is set to be equal to the axial direction length of the yoke 10.

Figure 3:
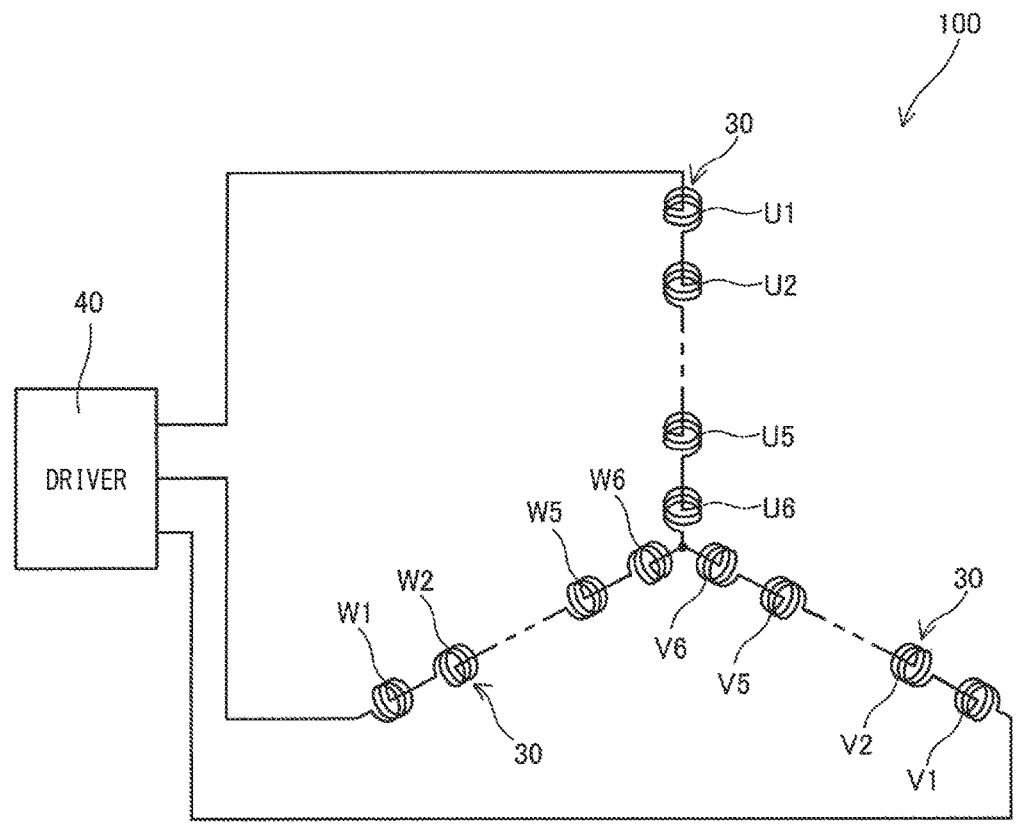
FIG. 3 is a view showing an equivalent electric circuit of the linear motor.

As shown in FIG. 3, in the linear motor 100, the U phase coils U1 to U6 are connected to each other in series, the V phase coils V1 to V6 are connected to each other in series, and the W phase coils W1 to W6 are connected to each other in series. The metal wires 30A of the U phase coils U1, U3, U5, the V phase coils V2, V4, V6, and the W phase coils W2, W4, W6 are wound around the rod 20 in one direction, while the metal wires 30A of the U phase coils U2, U4, U6, the V phase coils V1, V3, V5, and the W phase coils W1, W3, W5 are wound around the rod 20 in another direction (an opposite direction to the one direction).

Further, respective end portions of the U phase coil U1, the V phase coil V1, and the W phase coil W1 on a tip end side are connected to a driver 40, while respective end portions of the U phase coil U6, the V phase coil V6, and the W phase coil W6 on a rear end side are Y-connected.

The driver 40 is a control device that controls the supply of the alternating current to the U phase coils U1 to U6, V phase coils V1 to V6, and W phase coils W1 to W6. The driver 40 controls a frequency, an energization timing, and so on of the alternating current on the basis of information indicating relative positions of the yoke 10 and the rod 20, these relative positions being detected by a position sensor not shown in the figures. As a result, the thrust generated by the linear motor 100 and a thrust generation direction are adjusted, whereupon the yoke 10 is moved along the rail 4 together with the carrier 5 by the adjusted thrust (see FIG. 1).

Figure 2:
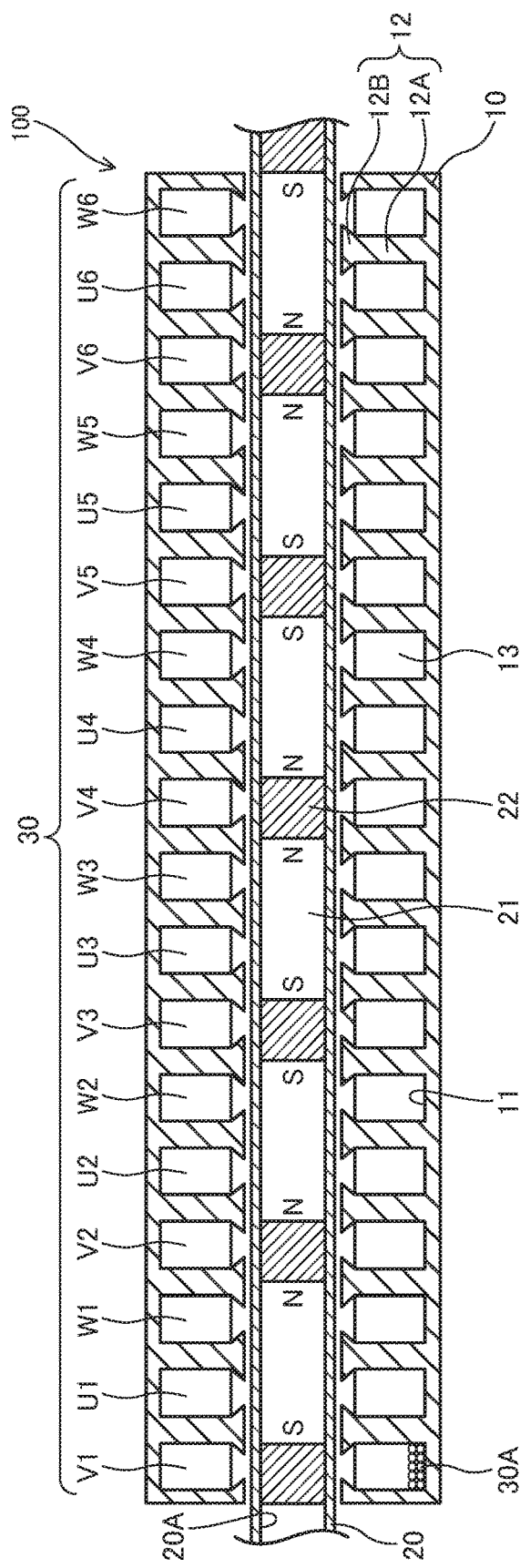
FIG. 2 is a sectional view showing a part of the linear motor.

As described above, according to the finding obtained by the inventors of this application by analyzing the magnetic field in a simulation, with a linear motor in which the coils are disposed in a similar manner to FIG. 2, magnetic flux linkage in the V phase coil disposed at the left end of the yoke and the W phase coil disposed at the right end of the yoke decreases relative to magnetic flux linkage in the other coils. In this case, thrust (V phase component thrust) generated on the basis of the moving magnetic field of the six V phase coils and thrust (W phase component thrust) generated on the basis of the moving magnetic field of the six W phase coils become smaller than thrust (U phase component thrust) generated on the basis of the moving magnetic field of the six U phase coils. When the U phase component thrust differs from the V phase component thrust and the W phase component thrust in this manner, a thrust ripple is generated, and as a result, the controllability of the linear motor deteriorates.

Hence, in the linear motor 100 according to this embodiment, variation in the thrust of the respective phase components is suppressed by setting a total number of coil windings (a total number of U phase coil windings) of the U phase coils U1 to U6 to be smaller than a total number of coil windings (a total number of V phase coil windings) of the V phase coils V1 to V6 and a total number of coil windings (a total number of W phase coil windings) of the W phase coils W1 to W6. The total number of U phase coil windings is set to be smaller than the total number of V phase coil windings and the total number of W phase coil winding by setting respective numbers of coil windings of the two U phase coils U1, U6 disposed near the respective ends of the yoke 10 to be smaller than respective numbers of coil windings of the other U phase coils U2 to U5.

By setting the total number of U phase coil windings to be smaller than the total number of V phase coil windings and the total number of W phase coil windings in this manner, the U phase component thrust can be reduced, and as a result, the U phase component thrust can be adjusted so as to be equal to the V phase component thrust and W phase component thrust that are reduced by the reduction in magnetic flux linkage.

With the linear motor 100 according to this embodiment, as described above, magnitudes of the thrust of the respective phase components can be made equal to each other by reducing the total number of U phase coil windings even when the V phase coil V1 and the W phase coil W6 are disposed on the end portions of the yoke 10. Accordingly, generation of a thrust ripple in the linear motor 100 can be suppressed, and as a result, the controllability of the linear motor 100 can be improved.

Further, in the linear motor 100, the total number of U phase coil windings is set to be smaller than the total number of V phase coil windings and the total number of W phase coil windings by making the respective number of coil windings of the U phase coils U1, U6 smaller than the respective numbers of coil windings of the other U phase coils U2 to U5. Of the six U phase coils U1 to U6, the U phase coils U1, U6 are positioned on the axial direction outer sides, and therefore the numbers of coil windings thereof can be adjusted easily.

It should be noted that in the linear motor 100, the total number of U phase coil windings is reduced by reducing the numbers of coil windings of the U phase coils U1, U6, but the total number of U phase coil windings may be reduced by reducing the number of coil windings of any one or more coils among the U phase coils U1 to U6.

An embodiment of the present invention was described above, but the above embodiment is merely one example of an application of the present invention, and the technical scope of the present invention is not limited to the specific configurations of the above embodiment.

In the linear motor 100 according to this embodiment, the total number of U phase coil windings is set to be smaller than the total number of V phase coil windings and the total number of W phase coil windings in order to make the U phase component thrust, the V phase component thrust, and the W phase component thrust equal to each other. Accordingly, for example, the total number of U phase coil windings may be made smaller than the total number of V phase coil windings and the total number of W phase coil windings by making the number of coil windings of the V phase coil V1 on one end side of the yoke 10 larger than the respective numbers of coil windings of the V phase coils V2 to V6, and making the number of coil windings of the W phase coil W6 on the other end side of the yoke 10 larger than the respective numbers of coil windings of the W phase coils W1 to W5.

By adjusting the numbers of coil windings in this manner, a reduction in the V phase component thrust and the W phase component thrust can be suppressed even when the V phase coil V1 and the W phase coil W6 are disposed on the end portions of the yoke 10, and therefore the magnitudes of the thrust of the respective phase components can be made equal to each other. As a result, generation of a thrust ripple in the linear motor 100 can be suppressed. As shown in FIG. 3, the V phase coil V1 and the W phase coil W6 are positioned on the outermost sides relative to the other series-connected coils of the same phases, and therefore the respective numbers of coil windings thereof can be adjusted easily. It should be noted that in the linear motor 100, the total number of V phase coil windings and the total number of W phase coil windings are increased by increasing the respective numbers of coil windings of the V phase coil V1 and the W phase coil W6, but the total number of V phase coil windings and the total number of W phase coil windings may be increased by increasing the number of coil windings of any one or more coils among the V phase coils V1 to V6 and the number of coil windings of any one or more coils among the W phase coils W1 to W6.

In this embodiment, the linear motor 100 is configured as an eighteen-slot linear motor, but may be configured as any 3n-slot linear motor (where n is a positive integer), such as a three-slot linear motor including one U phase coil, one V phase coil, and one W phase coil or a six-slot linear motor including two U phase coils, two V phase coils, and two W phase coils.

Furthermore, in the linear motor 100 according to this embodiment, the plurality of permanent magnets 21 are arranged in the axial direction and fixed in the through hole 20A of the rod 20, but the permanent magnets 21 are not limited to this arrangement. For example, the permanent magnets 21 may be formed in a ring shape and fitted externally to an outer periphery of the rod 20, and the plurality of permanent magnets 21 may be arranged in the axial direction so as to oppose the tip ends of the teeth 12.

This application claims priority based on Japanese Patent Application No. 2014-49302, filed with the Japan Patent Office on Mar. 12, 2014, the entire contents of which are incorporated into this specification by reference.

The invention claimed is:

1. A linear motor that has a tubular body and a rod that penetrates the tubular body in an axial direction, and is configured to displace the tubular body and the rod relative to each other in the axial direction, comprising:
   a plurality of teeth arranged in the axial direction so as to project from an inner peripheral surface of the tubular body;
   slots formed between adjacent teeth of the plurality of teeth;
   a plurality of coils, each of which is disposed in a respective one of the slots, the plurality of coils including more than two first phase coils, more than two second phase coils, and more than two third phase coils, through which a three-phase alternating current passing; and
   permanent magnets provided in the rod and arranged in the axial direction so as to oppose the coils,
   wherein
   the first phase coils include an end first phase coil disposed in a slot positioned at one end of the tubular body, and the second phase coils include an end second phase coil disposed in a slot positioned at another end of the tubular body,
   a total number of coil windings of the third phase coils is set to be smaller than a total number of coil windings of the first phase coils and a total number of coil windings of the second phase coils, and
   a number of coil windings of each of third phase coils disposed next to the end first phase coil and the end second phase coil is set to be smaller than a number of coil windings of each of the third phase coils other than the third phase coils disposed next to the end first phase coil and the end second phase coil.

2. The linear motor as defined in claim 1, wherein a number of coil windings of the end first phase coil is set to be larger than a number of coil windings of each of the first phase coils other than the end first phase coil, and a number of coil windings of the end second phase coil is set to be larger than a number of coil windings of each of the second phase coils other than the end second phase coil.

* * * * *